(12) United States Patent
Chang

(10) Patent No.: US 7,993,020 B2
(45) Date of Patent: *Aug. 9, 2011

(54) OPTICAL PLATE HAVING TRIANGULAR PYRAMIDAL DEPRESSIONS AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 222 days.

This patent is subject to a terminal disclaimer.

(21) Appl. No.: 12/319,045

(22) Filed: Dec. 31, 2008

(65) Prior Publication Data
US 2010/0002416 A1    Jan. 7, 2010

(30) Foreign Application Priority Data
Jul. 4, 2008   (CN) .......................... 2008 1 0302545

(51) Int. Cl.
*F21V 13/04*   (2006.01)
*F21V 5/02*    (2006.01)

(52) U.S. Cl. ........ 362/97.1; 362/309; 362/330; 362/339

(58) Field of Classification Search .................. 362/301, 362/309, 327, 329, 330, 339, 244, 333, 97.1–97.4; 359/625, 831, 837
See application file for complete search history.

(56) References Cited

U.S. PATENT DOCUMENTS

| | | | | |
|---|---|---|---|---|
| 1,950,560 A * | 3/1934 | Martinek et al. | ............. | 359/533 |
| 3,049,616 A * | 8/1962 | Davis | ............. | 362/330 |
| 3,566,102 A * | 2/1971 | Choyke, Jr. | ............. | 362/317 |
| 3,716,710 A * | 2/1973 | Clostermann et al. | ............. | 362/339 |
| 3,764,800 A * | 10/1973 | Clostermann | ............. | 362/330 |
| 6,666,569 B2 * | 12/2003 | Obata | ............. | 362/339 |
| 7,645,058 B2 * | 1/2010 | Kurokawa et al. | ............. | 362/339 |
| 7,656,597 B2 * | 2/2010 | Hsu et al. | ............. | 359/831 |
| 7,686,474 B2 * | 3/2010 | Chou et al. | ............. | 362/244 |
| 7,715,132 B2 * | 5/2010 | Chang | ............. | 359/831 |
| 7,753,565 B2 * | 7/2010 | Hsu et al. | ............. | 362/339 |
| 2009/0323326 A1 * | 12/2009 | Chang | ............. | 362/235 |

* cited by examiner

*Primary Examiner* — Alan Cariaso
(74) *Attorney, Agent, or Firm* — Clifford O. Chi

(57) ABSTRACT

An optical plate includes a light output surface and a bottom surface opposite to the light output surface. The light output surface defines a plurality of triangular pyramidal depressions and a plurality of four-sided pyramidal depressions. Each four-sided pyramidal depression is surrounded by four triangular pyramidal depressions.

11 Claims, 7 Drawing Sheets

US 7,993,020 B2

OPTICAL PLATE HAVING TRIANGULAR PYRAMIDAL DEPRESSIONS AND BACKLIGHT MODULE USING THE SAME

CROSS-REFERENCE TO RELATED APPLICATIONS

This application is related to five co-pending U.S. patent applications, which are: and applications Ser. Nos. 12/319,007, 12/319,046, 12/319,042, 12/317,990 and 12/319,006, and all entitled "OPTICAL PLATE AND BACKLIGHT MODULE USING THE SAME". In the co-pending applications, the inventor is Shao-Han Chang. The co-pending applications have the same assignee as the present application. The disclosure of the above identified applications is incorporated herein by reference.

BACKGROUND

1. Technical Field

The present disclosure relates an optical plate and a back light module using the optical plate.

2. Description of the Related Art

Referring to FIGS. 6 and 7, a typical direct back light module 100 includes a frame 11, a plurality of light sources 12, a light diffusion plate 13, and a prism sheet 10. The light sources 12 are positioned in an inner side of the frame 11. The light diffusion plate 13 and the prism sheet 10 are positioned on the light sources 12 above a top of the frame 11 in that order.

The light diffusion plate 13 includes a plurality of diffusion particles (not shown) to scatter light. The prism sheet 10 includes a transparent substrate 101 and a prismatic layer 103 formed on the transparent substrate 101. The prismatic layer 103 forms a plurality of elongated V-shaped protrusions 105.

In use, light emitted from the light sources 12 enters into the light diffusion plate 13 and becomes scattered. The scattered light leaves the diffusion plate 13 to the prism sheet 10. The scattered light then travels through the prism sheet 10, and is refracted out of at the elongated V-shaped protrusions 105 and concentrated by the elongated V-shaped protrusions 105, thus enhancing an illumination of the back light module 100 within a predetermined view angle.

However, although light from the light sources 12 enters the diffusion plate 13 and becomes scattered, after the light leaves the prism sheet 10, strong light spots of the light sources 12 directly above the light sources 12 are often formed. Therefore, an upper diffusion film 14 may be positioned on the prism sheet 10 to reduce or eliminate light spots of the light sources 12. However, since the upper light diffusion film 14 and the prism sheet 10 are in contact with each other, a plurality of air pockets exist around the boundaries of the light diffusion film 14 and the prism sheet 10. When the backlight module 100 is in use, light passes through the air pockets, and some of the light undergoes total reflection by the air pockets along one or more boundaries. In addition, the upper light diffusion film 14 may absorb a certain amount of the light from the prism sheet 10. As a result, a brightness of light illumination of the backlight module 100 is reduced.

Therefore, an optical plate and a back light module using the optical plate are desired in order to overcome the above-described shortcoming.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION OF THE EMBODIMENTS

Figure 1:
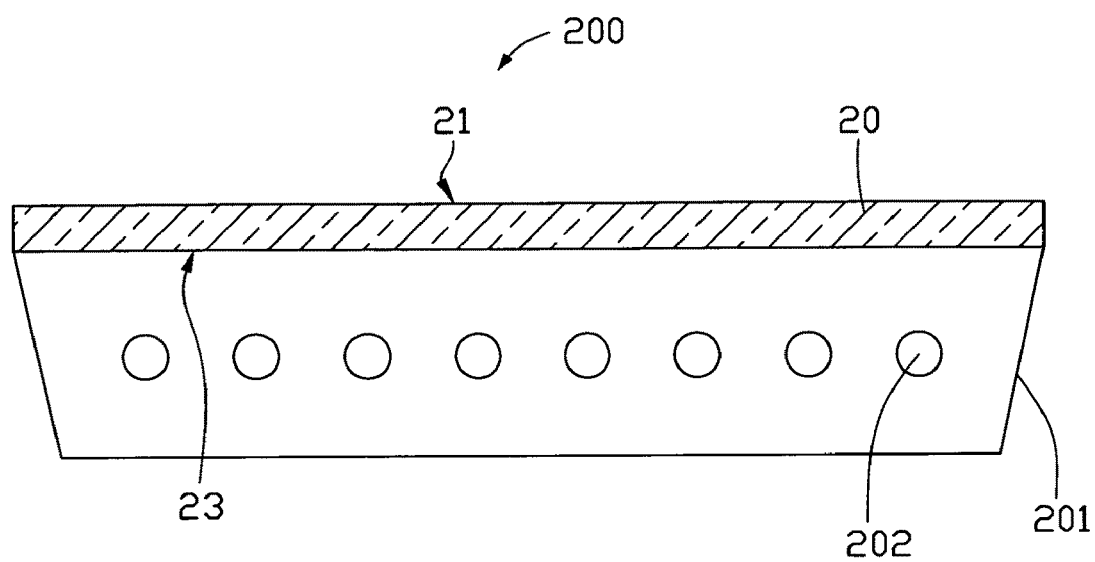
FIG. 1 is a cross-sectional view of one embodiment of a back light module including one embodiment of an optical plate.

Referring to FIG. 1, a back light module 200 includes an optical plate 20, a frame 201, and a plurality of light sources 202. The optical plate 20 includes a light output surface 21 on one side of the optical plate and a bottom surface 23 on another side of the optical plate 20 opposite to the light output surface 21. The light sources 202 are positioned in an inner side of the frame 201. The optical plate 20 is positioned on the light sources 202 such that the bottom surface 23 faces the light sources 202.

Figure 2:
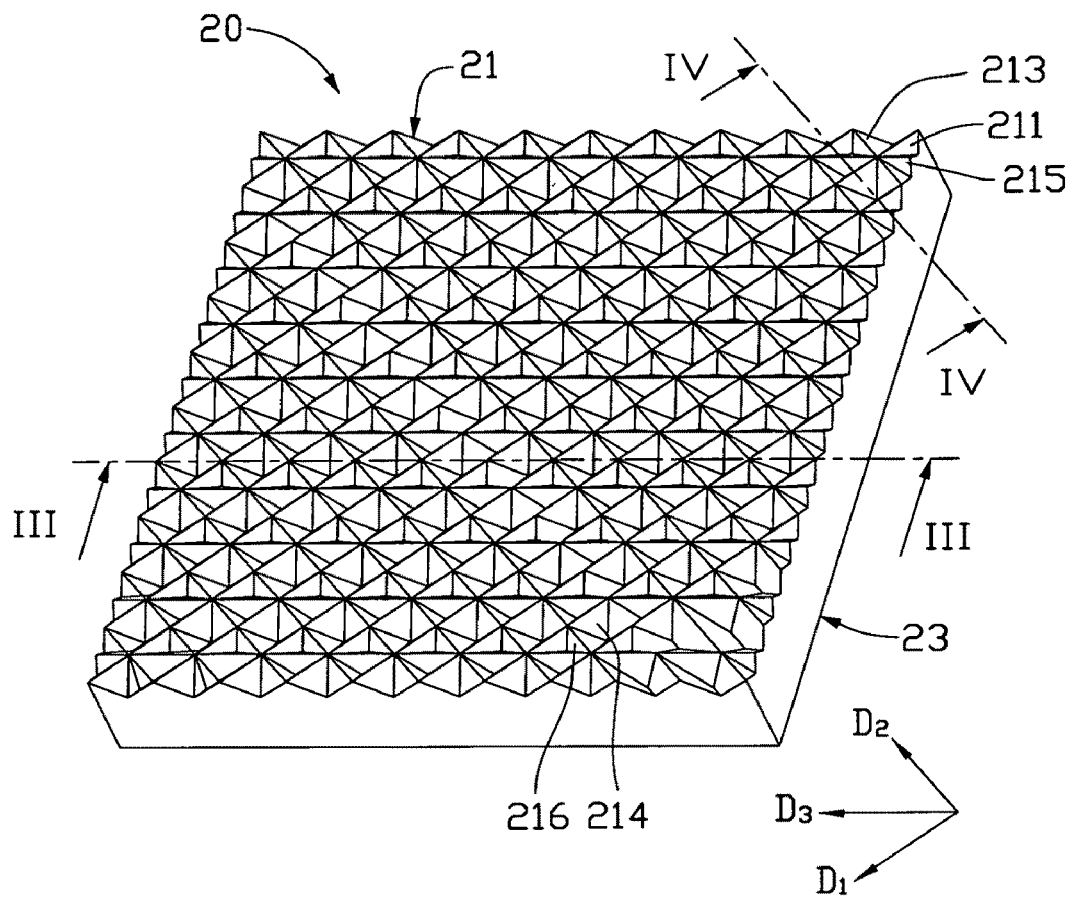
FIG. 2 is an isometric view of the optical plate in FIG. 1.
Figure 3:
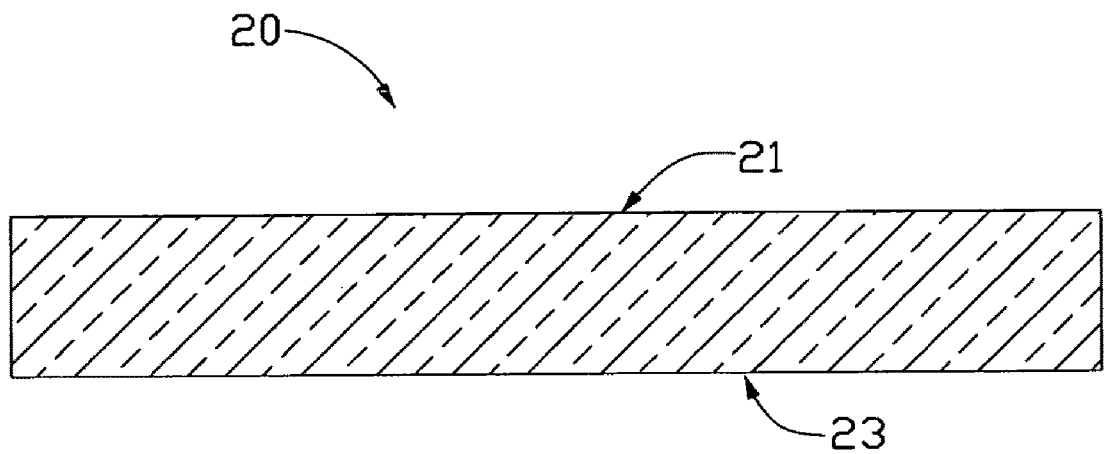
FIG. 3 is a cross-sectional view of the optical plate taken along the line III-III in FIG. 2.

Referring to FIGS. 2 and 3, the light output surface 21 defines a plurality of four-sided pyramidal depressions 214. The bottom surface 23 may be flat, rough, or curved. The transparency of the optical plate 20 may be determined according to the visible light spectrum.

The four-sided pyramidal depressions 214 are closely connected. Corresponding sidewalls on each side of the adjacent four-sided pyramidal depressions 214 sharing a same edge collectively form a plurality of first V-shaped ridges 211 and a plurality of second V-shaped ridges 213. The first V-shaped ridges are aligned in a first direction $D_1$. The second V-shaped ridges are aligned in a second direction $D_2$. In addition, a plurality of third V-shaped ridges 215 aligned in a third direction $D_3$ are formed on the light output surface 21. Each third V-shaped ridge passes through intersections of the first V-shaped ridges 211 and the second V-shaped ridges 213. As a result, each corresponding four-sided pyramidal depression 214 is divided into two triangular pyramid depressions 204 such that each four-sided pyramidal depression 214 is surrounded by four triangular pyramidal depressions 216.

In the illustrated embodiment, four corners of a square base of each four-sided pyramidal depression 214 intersect with a corner of a square base of the four adjacent four-sided pyramidal depressions 214. Four edges of the square base of each four-sided pyramidal depression 214 intersect with four edges of the triangular bases of four adjacent triangular pyramidal depressions 216 such that each four-sided pyramidal depression 214 is surrounded by four of the triangular pyramidal depressions 216.

In the illustrated embodiment, an angle defined by the first direction $D_1$ and the second direction $D_2$ is about 90 degrees, and an angle defined by the first direction $D_1$ and the third direction $D_3$ is about 45 degrees.

Figure 4:
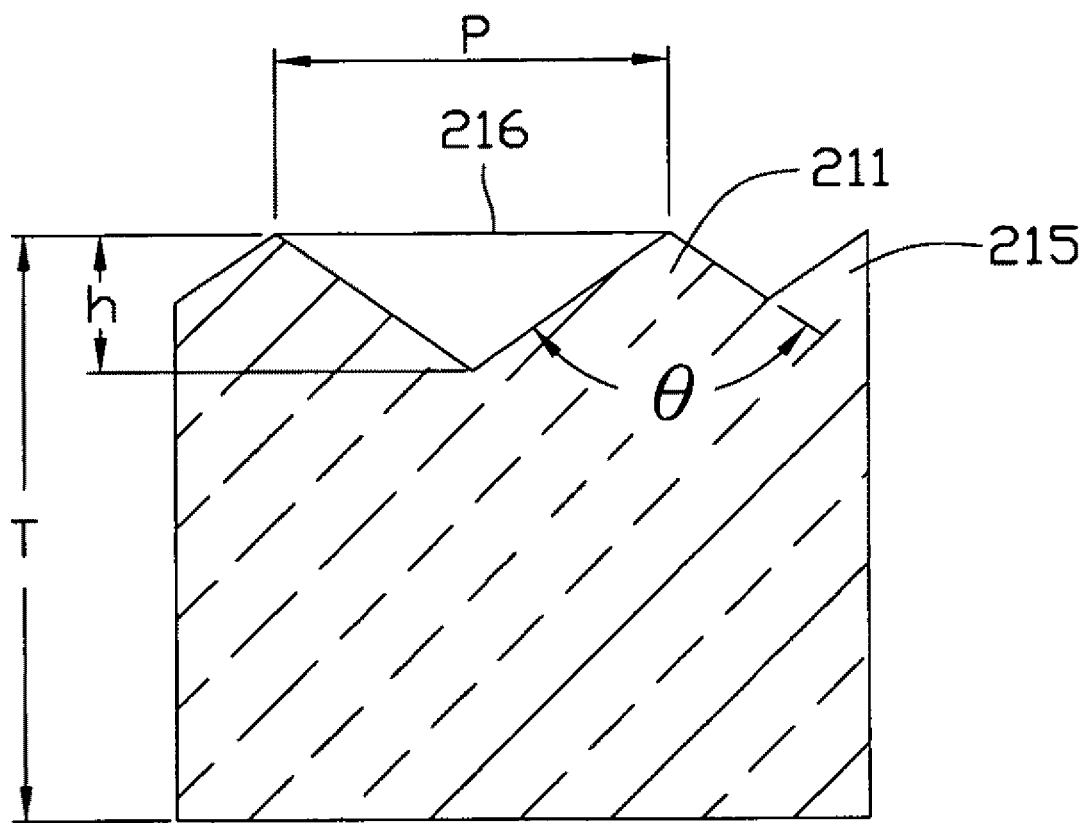
FIG. 4 is a partial cross-sectional view of the optical palate taken along the line IV-IV in FIG. 2.

Referring to FIG. 4, a vertex angle θ of the first V-shaped ridges 211 is about 80 degrees to about 100 degrees, and a pitch P of adjacent first V-shaped ridges 211 is about 0.025 millimeters (mm) to about 1 mm. Additionally, the vertex angle θ may be adjusted such that a view angle thereof can be adjusted.

It may be appreciated that parameters of the second V-shaped ridges 213 and the third V-shaped ridges 215, such as vertex angle and pitch, can be the same as or different from parameters of the first V-shaped ridges 211. In the illustrated embodiment, the vertex angle and the pitch of the second V-shaped ridges 213 and the third V-shaped ridges 215 are the same as the first V-shaped ridges 211.

A height h of the first V-shaped ridges 211, a height of the second V-shaped ridges 213, and a height of the third V-shaped ridges 215 may be substantially equal to or different from each other.

A thickness T of the optical plate 20 is about 0.4 mm to about 4 mm. The optical plate 20 may be made of a material such as polycarbonate, polymethyl methacrylate, polystyrene, copolymer of methyl methacrylate and styrene, and any suitable combination of those.

In use, light enters the optical plate 20 via the bottom surface 23. Since the inner surfaces of the four-sided pyramidal depressions 214 and the inner surface of the triangular pyramidal depressions 216 are slanted, incident light that may have been internally reflected on a flat surface, are refracted, reflected, and diffracted. As a result, light outputted from the light output surface 21 is more uniform than light outputted from a light output surface of a typical prism sheet. Since strong light spots of the light sources seldom or never occur, an extra upper light diffusion film on the optical plate 20 is unneccesary. Thus, the efficiency of light utilization is enhanced.

Figure 5:
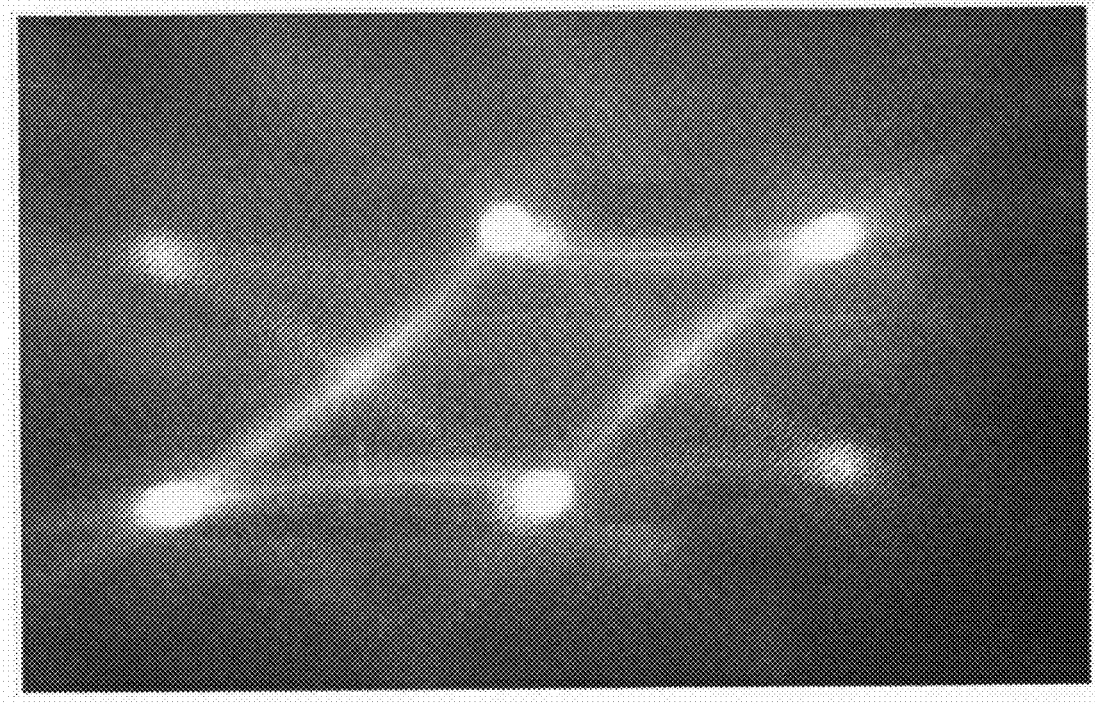
FIG. 5 is a photo showing an illumination distribution testing light of an LED passing through the optical plate in FIG. 2.
Figure 6:
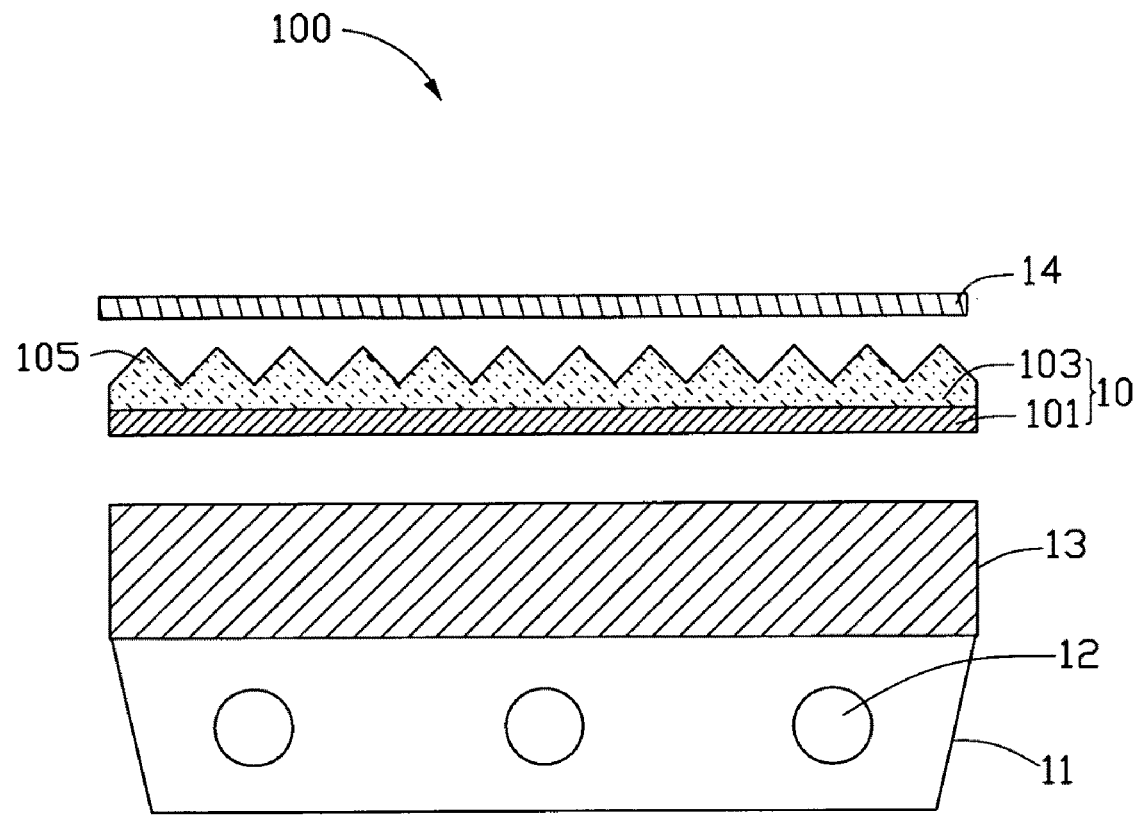
FIG. 6 is an exploded, cross-sectional view of a typical back light module.
Figure 7:
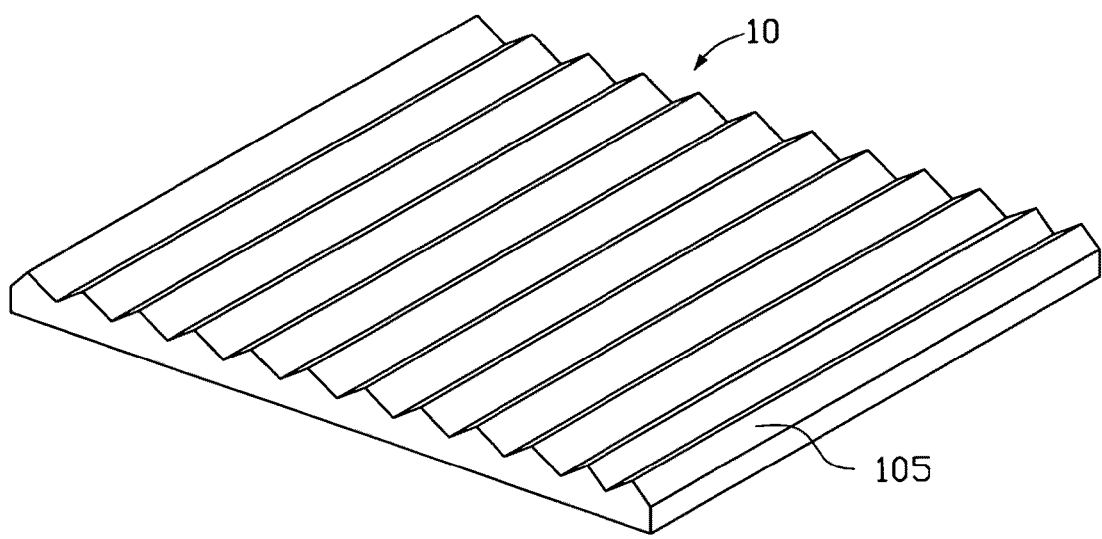
FIG. 7 is an isometric view of a prism sheet of the typical back light module of FIG. 6.

Referring to FIG. 5, light emitted from an LED will form six separated virtual light sources after passing through the triangular pyramidal depressions 216 and the four-sided pyramidal depressions 214. As a result, the optical plate 20 is able to enhance uniformity of the light distribution of the back light module 200 and reduce or avoid strong light spots of the light sources.

In contrast to the typical prism sheet, the optical plate 20 may be integrally formed by injection molding technology. Injection molding is easier to mass-produce the optical plate 20. Furthermore, since the prism lenses of the typical prism sheet are formed by solidifying melted ultraviolet-cured transparent resin, the prism lenses of the conventional prism sheet are easily damaged due to poor rigidity and mechanical strength and scratched. Thus, the optical plate 20 has a better rigidity and mechanical strength than the typical prism sheet.

The interior of the frame 201 is configured to be highly reflective.

The light sources 202 may be point light sources such as light emitting diodes or linear light sources such as cold cathode fluorescent lamps. In the illustrated embodiment, the light sources 202 are closely positioned cold cathode fluorescent lamps.

If a pitch of the light sources 202 are relatively big, a light diffusion plate may be positioned between the optical plate 20 and the light sources 202 in the back light module 200 to further improve a uniform brightness of the back light module 200.

Finally, while various embodiments have been described and illustrated, the embodiments are not to be construed as being limited thereto. Various modifications can be made to the embodiments by those skilled in the art without departing from the true spirit and scope of the present disclosure as defined by the appended claims.

What is claimed is:

1. An optical plate, comprising:
    a light output surface defining a plurality of triangular pyramidal depressions and a plurality of four-sided pyramidal depressions closely connected, each four-sided pyramidal depression surrounded by four triangular pyramidal depressions; and
    a bottom surface opposite to the light output surface;
    wherein four edges of the square base of each four-sided pyramidal depression intersect with four corresponding edges of the triangular bases of four adjacent triangular pyramidal depressions.

2. The optical plate of claim 1, wherein the light output surface forms a plurality of first V-shaped ridges extending along a first direction, a plurality of second V-shaped ridges extending along a second direction, and a plurality of third V-shaped ridges extending along a third direction; the first V-shaped ridges intersect with the second V-shaped ridges thereby forming the four-sided pyramidal depressions, the third V-shaped ridges pass through the intersections of the first V-shaped ridges and the second V-shaped ridges thereby forming the triangular pyramidal depressions.

3. The optical plate of claim 2, wherein an angle defined by the first direction and the second direction is about 90 degrees.

4. The optical plate of claim 2, wherein an angle defined by the first direction and the third direction is about 45 degrees.

5. The optical plate of claim 2, wherein a top of the first V-shaped ridges, a top of the second V-shaped ridges, and a top of the third V-shaped ridges are in a same plane.

6. The optical plate of claim 2, wherein a vertex angle of the first V-shaped ridges, the second V-shaped ridges, and the third V-shaped ridges is about 80 degrees to about 100 degrees.

7. The optical plate of claim 2, wherein a pitch between adjacent first V-shaped ridges, a pitch between adjacent the second V-shaped ridges, and a pitch between adjacent third V-shaped ridges is about 0.025 millimeters to about 1 millimeter.

8. The optical plate of claim 1, wherein the optical plate is made of a material selected from the group consisting of polycarbonate, polymethyl methacrylate, polystyrene, copolymer of methylmethacrylate and styrene, and any combination thereof.

9. A backlight module, comprising:
    a frame;
    a plurality of light sources positioned in an inner side of the frame; and
    an optical plate positioned on the frame, comprising:
    a light output surface and a bottom surface opposite to the light output surface, wherein the light output surface defines a plurality of triangular pyramidal depressions and a plurality of four-sided pyramidal depressions closely connected, each four-sided pyramidal depression is surrounded by four triangular pyramidal depressions;
    wherein, four edges of the square base of each four-sided pyramidal depression intersect with four corresponding edges of the triangular bases of four adjacent triangular pyramidal depressions.

10. The backlight module of claim 9, wherein the light sources are closely positioned point light sources.

11. The backlight module of claim 9, wherein the inner side of the frame is highly reflective.

* * * * *